United States Patent [19]
Siga et al.

[11] Patent Number: 5,295,708
[45] Date of Patent: Mar. 22, 1994

[54] MOUNTING STRUCTURE OF AIR BAG MODULE FOR VEHICLE FRONT PASSENGER SEAT

[75] Inventors: Minoru Siga; Tatsuhisa Yamane, both of Osaka, Japan

[73] Assignee: Daihatsu Motor Co., Ltd., Osaka, Japan

[21] Appl. No.: 888,867

[22] Filed: May 27, 1992

[30] Foreign Application Priority Data
Jun. 28, 1991 [JP] Japan ............................ 3-50044[U]
May 13, 1992 [JP] Japan ............................ 4-120787

[51] Int. Cl.⁵ .............................................. B60R 21/20
[52] U.S. Cl. ................................................. 280/732
[58] Field of Search ............ 280/728 R, 728 A, 730, 280/732

[56] References Cited
U.S. PATENT DOCUMENTS
5,150,919  9/1992  Sakakida et al. .................... 280/732

FOREIGN PATENT DOCUMENTS
0357225  3/1990  European Pat. Off. .
0378314  7/1990  European Pat. Off. .
2606640  8/1977  Fed. Rep. of Germany .
2-249742  10/1990  Japan .
3-28048  2/1991  Japan .
4-56654  2/1992  Japan ............................ 280/728 A

*Primary Examiner*—Edwin L. Swinehart
*Attorney, Agent, or Firm*—William H. Eilberg

[57] ABSTRACT

A mounting structure of an air bag module for a vehicle front passenger seat comprises a pillar-to-pillar member extending widthwise of the vehicle in an instrument panel. The pillar-to-pillar member includes a pair of divided pieces which are interrupted at a position in front of the front passenger seat. The pillar-to-pillar member further includes an intermediate module mount which is arranged between and connected to the respective divided pieces. The module mount has an upwardly open recess for fixedly receiving a bottom portion of the air bag module.

9 Claims, 6 Drawing Sheets

MOUNTING STRUCTURE OF AIR BAG MODULE FOR VEHICLE FRONT PASSENGER SEAT

BACKGROUND OF THE INVENTION

1. Field of the Invention

This invention relates generally to the air bag system which is increasingly employed in various cars to improve safety at the time of a car crash. More particularly, the present invention relates to a mounting structure of an air bag module for a vehicle front passenger seat.

2. Description of the Prior Art

As is well known, the air bag system is a safety device incorporated in a car for preventing the driver and/or front passenger from impinging directly onto front interior parts (the steering wheel and the instrument panel) at the time of a car crash, thereby eliminating or reducing the human injury or death. Indeed, this system is known to compensate for what is lacking in the known safety belt system.

In general, the air bag system mainly comprises a plurality of shock sensors, a controller for generating an actuation signal when one or more of the shock sensors have detected a true crash, a gas generator (inflator) for explosively generating nitrogen gas in response to the actuation signal, and an air bag connected to the gas generator for expanding toward the driving seat or front passenger seat at the moment of the crash. The shock sensors are arranged at different portions of the car body such as the bumper and fenders suitable for detecting a car crash, whereas the controller is typically disposed on the front bulkhead On the other hand, the gas generator and the air bag constitute a single housed unit called "air bag module" together with other related components. The air bag module is normally arranged in a central portion of the steering wheel in the case of the driving seat air bag system or within the instrument panel in the case of the front passenger seat air bag system.

The air bag module for the front passenger seat is typically supported on a cross member called "pillar-to-pillar member" which extends widthwise of the car within the instrument panel, as disclosed in Japanese Patent Application Laid-open Nos. 2-303948 and 2-303952 for example. The pillar-to-pillar member is a structural part which is used for supporting the instrument panel and the steering wheel.

In either of the above laid-open Japanese patent applications, the air bag module is supported above the pillar-to-pillar member at a position corresponding to the glove box (glove compartment) because the glove box is normally arranged in front of the front passenger seat. Thus, in order to provide a sufficient mounting space for the air bag module, it is necessary to downwardly displace the pillar-to-pillar member from a normal vertical position which is the position of the pillar-to-pillar member when no air bag module is provided.

However, if the pillar-to-pillar member is downwardly displaced, it approaches the glove box and the knees of the driver and front passenger. As a result, the glove box and the instrument panel are mechanically reinforced at portions thereof near the knees of the driver and front passenger by the thus lowered pillar-to-pillar member. Therefore, when the knees of the driver and front passenger impinge on the instrument panel and the glove box at the time of a car crash, a large crash load is applied to the knees, which may result in a serious injury.

Further, the downward displacement of the pillar-to-pillar member inevitably leads to a reduction of the glove box volume. Additionally, if the glove box has no ceiling of its own, the lowered pillar-to-pillar member becomes visible from inside the cabin when the glove box is opened, thus deteriorating the appearance.

SUMMARY OF THE INVENTION

It is, therefore, an object of the present invention to provide a structure which is capable of mounting an air bag module on a pillar-to-pillar member without requiring to downwardly displace the pillar-to-pillar member as a whole, thereby preventing an unacceptable increase of the crash load applied to the driver's and front passenger's knees while also preventing a reduction of the glove box volume and an appearance deterioration.

Another object of the present invention is to provide a structure for mounting an air bag module with a high supporting rigidity for maximizing the performance of the air bag system.

According to the present invention, there is provided a mounting structure of an air bag module for a front passenger seat of a vehicle comprising a pillar-to-pillar member extending widthwise of the vehicle in an instrument panel, wherein the pillar-to-pillar member includes a pair of divided pieces which are interrupted at a position in front of the front passenger seat, the pillar-to-pillar member further including an intermediate module mount which is arranged between and connected to the respective divided pieces, the module mount having an upwardly open recess for fixedly receiving a bottom portion of the air bag module.

With the mounting structure described above, the module mount itself forms part of the pillar-to-pillar member. Thus, if the recess of the module mount is suitably designed, a sufficient space can be provided between the mount recess and the instrument panel for mounting the air bag module without requiring to downwardly displace the pillar-to-pillar member as a whole. Therefore, it is possible to prevent the problems of the prior art which would result from the necessity of downwardly displacing the pillar-to-pillar member.

Preferably, the pillar-to-pillar member further comprises front and rear reinforcing members each connected to the respective divided pieces, and the module mount is arranged between and fixed to the respective reinforcing members. Such an arrangement enhances the supporting rigidity of the module mount, thereby maximizing the performance of the air bag system at the time of a car crash.

Further advantageously, the pillar-to-pillar member is provided with at least one upwardly directed stopper at the position of the module mount for preventing deformation or displacement of the air bag module forwardly of the vehicle. Such an arrangement also insures that the inflated air bag is directed properly toward the front passenger seat at the time of a car crash.

Other objects, features and advantages of the present invention will become apparent from the following detailed description of the preferred embodiment given with reference to the accompanying drawings.

DETAILED DESCRIPTION OF THE PREFERRED EMBODIMENTS

Figure 1:
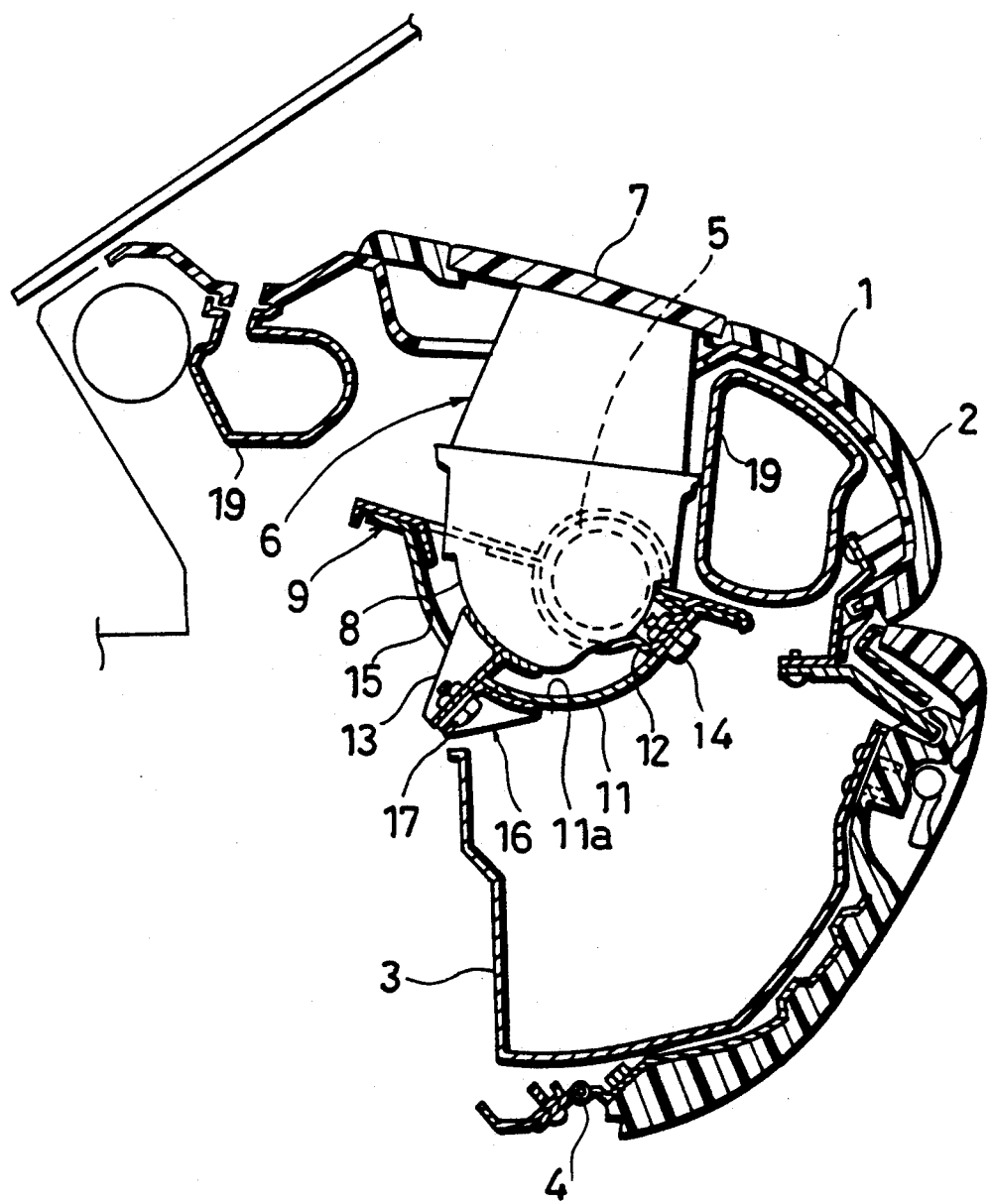
FIG. 1 is a sectional view showing a mounting structure of an air bag module embodying the present invention.
Figure 2:
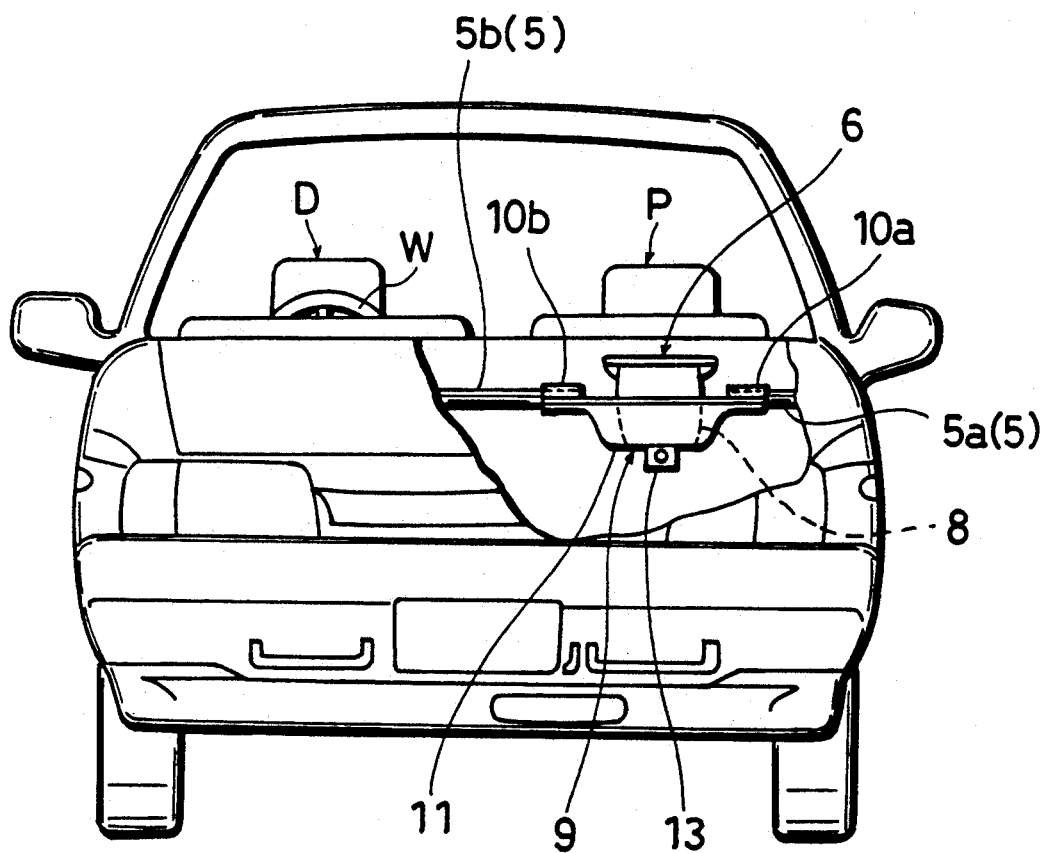
FIG. 2 is a front view, partly cut away, showing a car provided with the air bag module.
Figure 3:
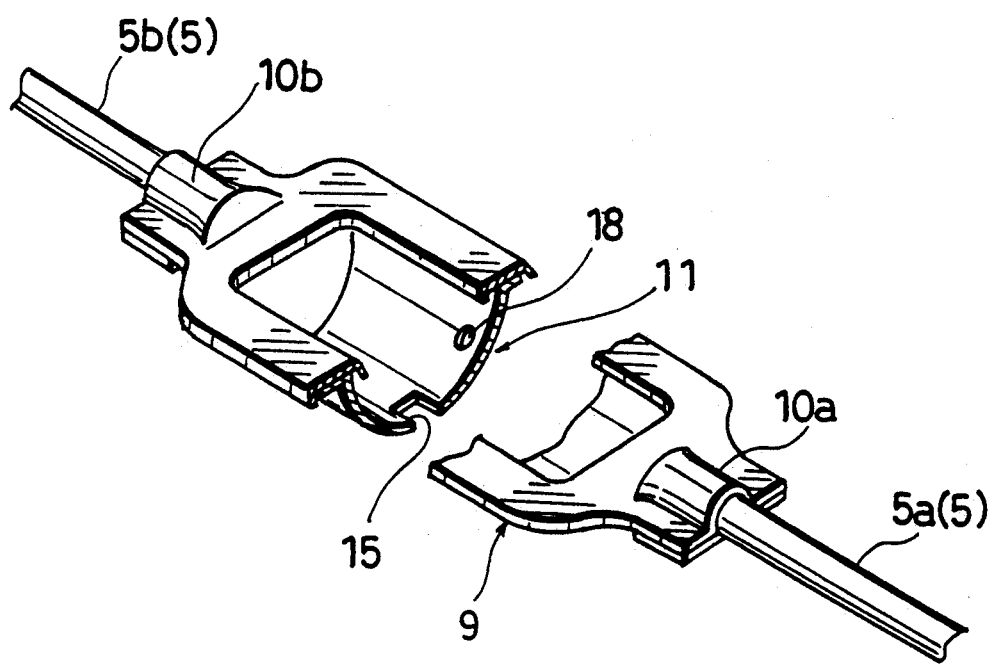
FIG. 3 is a perspective view, partly cut away, showing a principal portion of the module mounting structure.

Referring to FIGS. 1-3 showing a first embodiment of the present invention, a car C is shown to have an instrument panel 1 disposed before the driving seat D (FIG. 2) and front passenger seat P (also FIG. 2) within the cabin. As is well known, the instrument panel covers the cabin-side surface of the front bulkhead (not shown) and is used for arranging various instruments such as speedometer, fuel guage, switches, warning lights, and so on.

The instrument panel 1 is integrally made of resin to have an internal space for accommodating air ducts 19 and other fittings related to the respective instruments. The instrument panel has a surface portion provided with a safety padding 2 before the front passenger seat P for buffering the shocks at the time of passenger's impingement. Further, the instrument panel is also provided, at a lower portion thereof, with a glove box 3 which is pivotable about a hinge 4 for opening and closing.

In the internal space of the instrument panel 1, a pillar-to-pillar member 5 (hereafter referred to as "cross member") extends widthwise of the car from one front pillar to the other front pillar. The cross member 5, which itself is fixed to the respective front pillars, supports the instrument panel 1, the air ducts 19 and the steering wheel W (FIG. 2). Due to this supporting function, the cross member 5 is preferably tubular, but it may have a different cross-sectional shape if the strength requirement can be met.

An air bag module 6 is arranged in the internal space of the instrument panel 1 before the front passenger seat P. The module 6 contains an air bag (not shown) inflatable toward the front passenger seat P, and a gas generator (not shown) for explosively generating nitrogen gas to inflate the bag in response to a predetermined control signal. Normally, the module 6 is concealed under an openable lid 7.

The air bag module 6 is supported on the cross member 5, but the structure for mounting the module is specially designed according to the invention, as described below.

Specifically, the cross member 5 is made to have two divided pieces 5a, 5b which are spaced from each other at a position corresponding to the front passenger seat P, as shown in FIG. 2 The divided pieces 5a, 5b are connected together by an intermediate module mount 9 having a pair of connecting ends 10a, 10b for attachment to the respective pieces. The module mount has an upwardly open recess 11.

According to the first embodiment, the recess 11 of the module mount 9 is semicylindrical in cross section for receiving a correspondingly shaped bottom portion 8 of the air bag module 6, as shown in FIG. 1. For anchorage, the bottom portion 8 of the module is provided with a first bracket 12 projecting rearwardly downward, and a second bracket 13 projecting forwardly downward. The first bracket 12 is fixed to the module mount 9 by a bolt 14 engaging with the first bracket 12 through a mounting hole 18 (see FIG. 3) of the module mount. The second bracket 13 extends through an opening 15 of the module mount 9 for fixation, by a bolt 17, to a counterpart bracket 16 welded to the mount.

In the first embodiment, the position and orientation of the first and second brackets 12, 13 are selected so that the bolting operation therefor can be conveniently performed through the mount opening for the glove box 3. Such an arrangement greatly reduces the time required for mounting and removing the air bag module 6.

According to the arrangement described above, the divided pieces 5a, 5b are interrupted at the position corresponding to the front passenger seat P but connected together by the intermediate module mount 9. However, the recess 11 of the module mount has a bottom 11a which is located below the divided cross member pieces 5a, 5b, so that a sufficient space is provided between the module mount 9 and the instrument panel 2 for accommodating the air bag module 6 without requiring to downwardly displace the entirety of the cross member 5.

For comparison, it is assumed that the module mount 9 is supported on a conventional single-piece cross member. In this case, the entirety of the cross member must be displaced downwardly to a position below the bottom 11a of the module mount 9 which is held at the position shown in FIG. 1, and this lowered position of the cross member corresponds generally to the knees of the driver and front passenger. As a result, the portions of the instrument panel 2 and glove box 3 corresponding to the knees are unduly reinforced to apply a great crash load to the knees at the time of a car crash.

According to the present invention, on the other hand, the module mount 9 itself forms part of the cross member 5, so that the entirety of the cross member 5 need not be displaced downwardly to a position corresponding to the knees of the driver and front passenger. Thus, it is possible to prevent an unacceptable increase in the crash load applied to the knees As a result, the safety at the time of a car crash can be greatly increased.

Further, due to the non-necessity for downwardly displacing the entirety of the cross member 5, the volume of the glove box 3 need not be unduly reduced. Moreover, since the cross member pieces 5a, 5b are interrupted at the general position of the glove box 3, the presence of the cross member 5 does not unjustifiably deteriorate the internal appearance of the glove box 3 as viewed from the cabin side.

Figure 4:
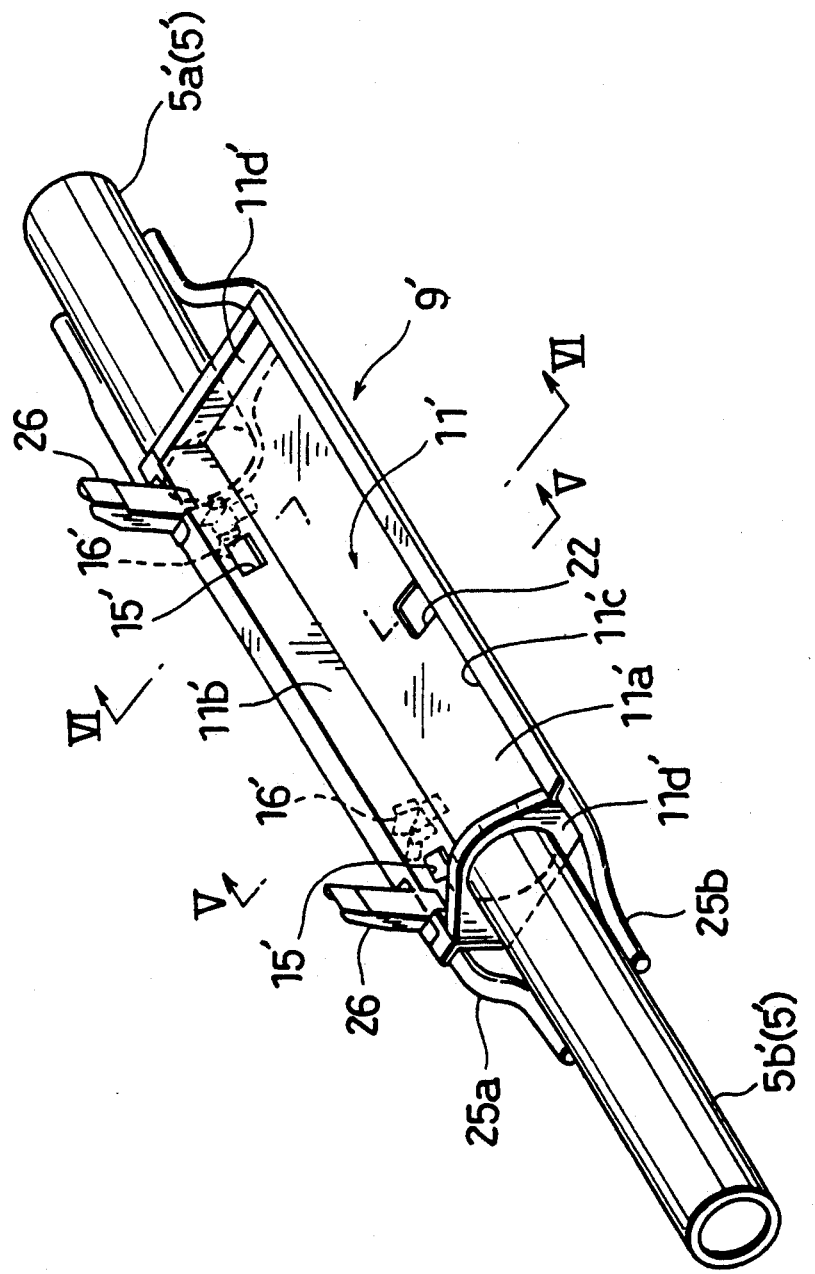
FIG. 4 is a perspective view showing a principal portion of another module mounting structure embodying the present invention.
Figure 5:
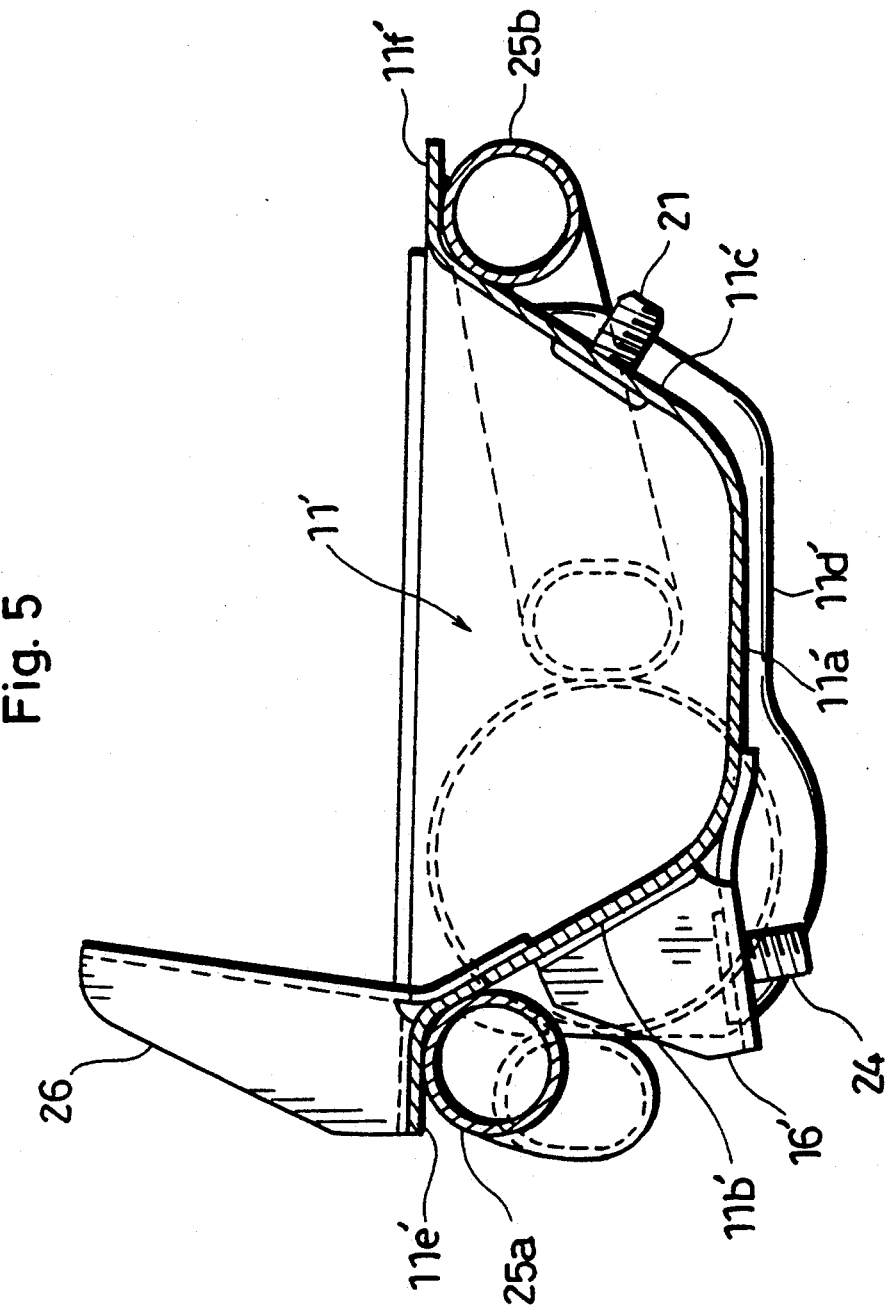
FIG. 5 is an enlarged sectional view taken along lines V—V in FIG. 4.
Figure 6:
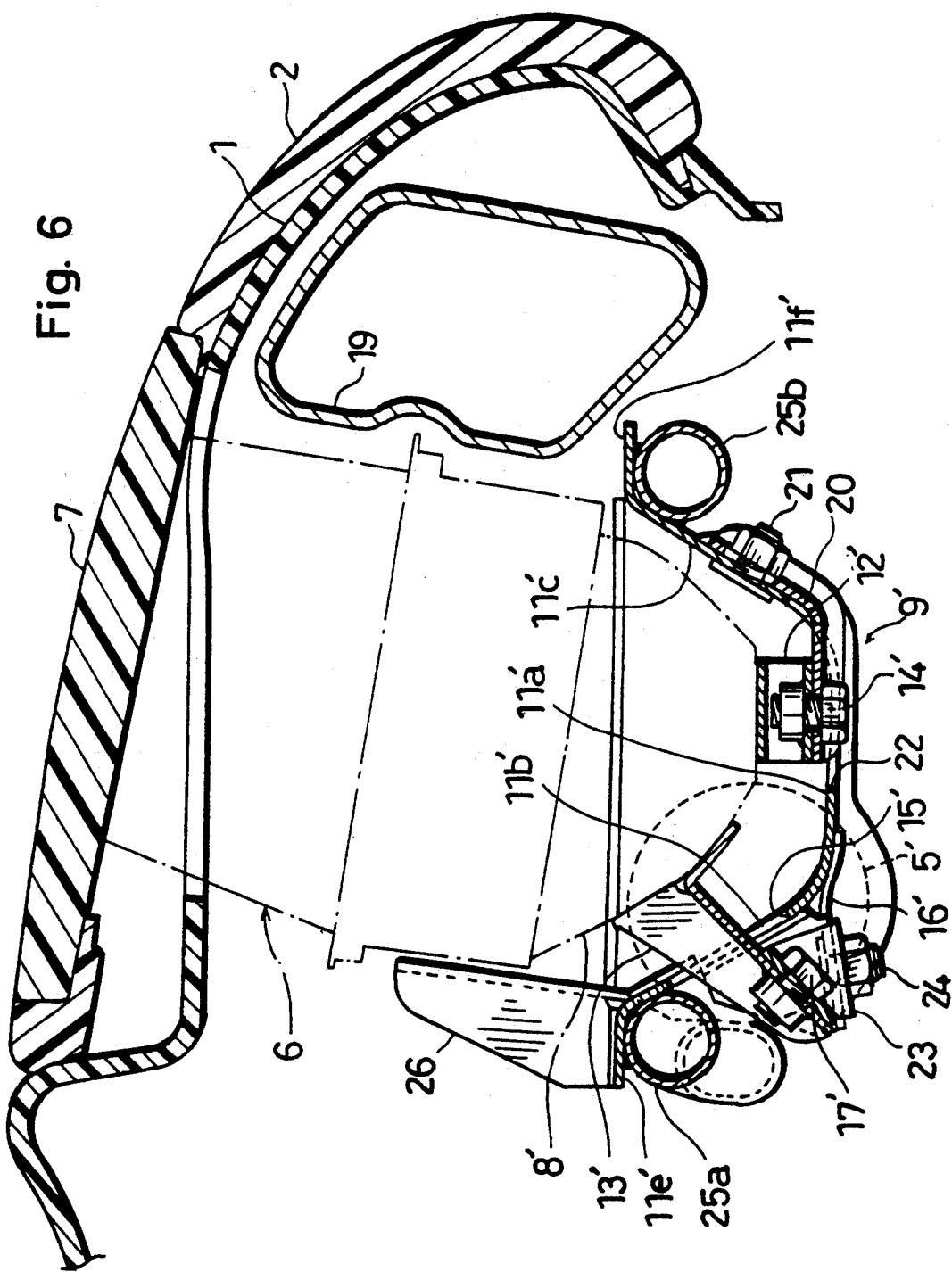
FIG. 6 is a view showing a section taken along lines VI—VI in FIG. 4 together with related parts.

FIGS. 4-6 show a second embodiment of the present invention. Similarly to the first embodiment, an air bag module 6' of the second embodiment is mounted under an openable lid 7 as supported on a cross member 5' which comprises a pair of divided pieces 5a', 5b' and an intermediate module mount 9'. The divided pieces 5a', 5b' are interrupted at a position corresponding to the front passenger seat, as in the first embodiment.

The module mount 9' has an upwardly open recess 11' which is defined by a bottom wall 11a', a front wall 11b', a rear wall 11c', and a pair of end walls 11d'. Thus, the module mount 9' of the second embodiment is generally trapezoidal in cross section for receiving a correspondingly shaped bottom portion 8' of the module 6'. The respective end walls 11d' are fixed to the respective divided pieces 5a', 5b' by butt welding for example. Further, the front and rear walls 11b', 11c' are formed with flanges 11e', 11f, respectively.

For anchorage, the bottom portion 8' of the module 6' is provided with a first bracket 12' projecting vertically downward, and a pair of second brackets 13' projecting forwardly downward. The first bracket 12 is fixed, by a bolt 14', to a mounting tongue 20 which in turn is fixed externally to the rear wall 11c of the module mount 9' by a bolt 21 but introduced into the module mount through an opening 22. Each of the second brackets 13' extends through a corresponding opening 15' of the module mount 9' for fixation, by a bolt 17', to an intermediate connector 23 which in turn is fixed, by a bolt 24, to a corresponding counterpart bracket 16' welded to the front wall 11b' of the mount. Similarly to the first embodiment, the entire bolting operation for mounting the air bag module 6' to the module mount 9' can be conveniently performed through the mount opening for the glove box (see FIG. 1).

According to the second embodiment, the module mount 9' is arranged between front and rear reinforcing pipes 25a, 25b. Specifically, the front reinforcing pipe 25a extends along the front flange 11e' of the mount immediately thereunder, and welded both to the front wall 11b' and the front flange 11e'. Similarly, the rear reinforcing pipe 25b extends along the rear flange 11f of the mount immediately thereunder, and welded both to the rear wall 11c' and the rear flange 11f. Further, each of the respective reinforcing pipes 25a, 25b has bent ends welded to the respective divided pieces 5a', 5b' of the cross member 5'. These reinforcing pipes 25a, 25b are significant at least in the following two respects.

First, the reinforcing pipes 25a, 25b enhance the rigidity, particularly torsional rigidity, of the cross member 5' as a whole. Indeed, the cross member 5' is an important structural element used for supporting the instrument panel 1, the steering wheel and the other related parts, so that it must satisfy a certain strength requirement. The reinforcing pipes 24a, 25b compensate for a strength reduction which would result from an interruption of the cross member 5' between the divided pieces 5a', 5b'.

Secondly, the reinforcing pipes 25a, 25b enhance the supporting rigidity of the module mount 9' itself. At a car crash, the air bag expands explosively with a high reaction force which may cause unexpected deformation or displacement of the module mount 9' (the bottom portion 8' of the module 6' as well). Such a deformation or displacement may hinder proper function of the air bag system. The reinforcing pipes 25a, 25b are therefore effective for insuring proper function of the air bag system.

Obviously, the reinforcing pipes 25a, 25b may be replaced by other reinforcing members. However, such reinforcing members should be preferably hollow for achieving a weight reduction while insuring an enough reinforcing function.

According to the second embodiment, further, the front wall 11b' or front flange 11e' of the module mount 9' is provided with a pair of upwardly directed stoppers 26 in facing relation to the air bag module 6' with a small clearance relative thereto. Each of the illustrated stoppers 26 is channel-shaped in view of mechanical strength, but it may be otherwise shaped.

As described above, the air bag expands explosively toward the front passenger seat with a large reaction force. If the module 6' pivots or deforms forwardly under this reaction force, the inflated bag is not properly oriented toward the front passenger seat. The stoppers 26 are effective for insuring that the inflated bag is properly oriented toward the seat.

Though not specifically described, the second embodiment enjoys the same advantages as the first embodiment because the former also has the features of the latter.

The present invention being thus described, it is obvious that the same may be varied in many ways. For instance, the recess 11, 11' of the module mount 9, 9' may be made to have a cross-sectional shape other than semicircular or trapezoidal. Further, the stoppers 26 may be provided integrally with the front reinforcing pipe 25a by upwardly bending a portion or portions of the reinforcing pipe. Such variations are not to be regarded as a departure from the spirit and scope of the the invention, and all such modifications as would be obvious to those skilled in the art are intended to be included within the scope of the following claims.

We claim:

1. A mounting structure of an air bag module for a vehicle, the vehicle having a driver's seat and a front passenger seat, the vehicle having a width, the mounting structure comprising a pillar-to-pillar member extending substantially across the full width of the vehicle in an instrument panel, wherein the pillar-to-pillar member includes a pair of divided pieces which are interrupted only at a position in front of the front passenger seat, the pillar-to-pillar member further including an intermediate module mount which is arranged between and connected to the respective divided pieces, the module mount having an upwardly open recess for fixedly receiving a bottom portion of the air bag module.

2. The mounting structure according to claim 1, wherein the pillar-to-pillar member further comprises front and rear reinforcing members each connected to the respective divided pieces, the module mount being arranged between and fixed to the respective reinforcing members.

3. The mounting structure according to claim 2, wherein the module mount has front and rear walls provided respectively with front and rear flanges, the front reinforcing member being located under the front flange in contact therewith, the rear reinforcing member being located under the rear flange in contact therewith.

4. The mounting structure according to claim 3, wherein the front reinforcing member is welded to the front flange and the front wall, the rear reinforcing member being welded to the rear flange and the rear wall.

5. The mounting structure according to claim 2, wherein each of the respective reinforcing members is made of a pipe.

6. The mounting structure according to claim 2, wherein each of the respective reinforcing members has bent ends for attachment to the respective divided pieces.

7. The mounting structure according to claim 1, wherein the pillar-to-pillar member is provided with at least one upwardly directed stopper at the position of the module mount for preventing deformation or displacement of the air bag module forwardly of the vehicle.

8. The mounting structure according to claim 7, wherein the stopper is made of a channel member.

9. The mounting structure according to claim 1, wherein each of the respective divided pieces is made of a pipe.

* * * * *